US012009163B2

(12) United States Patent
Javora et al.

(10) Patent No.: US 12,009,163 B2
(45) Date of Patent: Jun. 11, 2024

(54) THREE-POSITION DISCONNECTOR SWITCH

(71) Applicant: ABB Schweiz AG, Baden (CH)

(72) Inventors: Radek Javora, Hrusovany u Brna (CZ); Dietmar Gentsch, Ratingen (DE); Josef Cernohous, Jamne nad Orlici (CZ); Michal Skuci, Trencianske Stankovce (SK); Tomas Kozel, Brno (CZ); Kai Gorlt, Ratingen (DE)

(73) Assignee: ABB Schweiz AG, Baden (CH)

( * ) Notice: Subject to any disclaimer, the term of this patent is extended or adjusted under 35 U.S.C. 154(b) by 221 days.

(21) Appl. No.: 17/556,240

(22) Filed: Dec. 20, 2021

(65) Prior Publication Data

US 2022/0115195 A1 Apr. 14, 2022

Related U.S. Application Data

(63) Continuation of application No. PCT/EP2020/066077, filed on Jun. 10, 2020.

(30) Foreign Application Priority Data

Jun. 21, 2019 (EP) .................................... 19181787

(51) Int. Cl.
*H01H 1/62* (2006.01)
*H01H 31/00* (2006.01)
*H01H 31/26* (2006.01)

(52) U.S. Cl.
CPC ............ *H01H 31/003* (2013.01); *H01H 1/62* (2013.01); *H01H 31/26* (2013.01)

(58) Field of Classification Search
CPC ...... H01H 31/003; H01H 31/02; H01H 31/26; H01H 1/38; H01H 1/365; H01H 1/62; H01H 3/264

(Continued)

(56) References Cited

U.S. PATENT DOCUMENTS 6,559,403 B2 * 5/2003 Gutalj .................... H01H 31/24 218/43
6,680,453 B2 * 1/2004 Rokunohe .............. H01H 33/56 218/7

(Continued)

FOREIGN PATENT DOCUMENTS

DE 102006056656 * 6/2008 ........... H01H 31/003
EP 3240001 A1 11/2017

(Continued)

OTHER PUBLICATIONS

DE1020060566656 Translation (Original documents published Jun. 12, 2008) (Year: 2008).*

(Continued)

*Primary Examiner* — William A Bolton
(74) *Attorney, Agent, or Firm* — Leydig, Voit & Mayer, Ltd.

(57) ABSTRACT

A three-position disconnector switch includes an earthing contact, a power out contact, a power in contact, a piston, and a threaded rod. A length of the piston is such that in a first switch position an outer surface of a wall of the piston makes an electrical contact between the power out contact and the power in contact. The length of the piston is such that in a second switch position the outer surface of the wall of the piston does not make an electrical contact with either the earthing contact or the power in contact. The length of the piston is such that in a third switch position the outer surface of wall of the piston makes an electrical contact between the earthing contact and the power out contact. The piston includes an inner threaded section configured to engage with the threaded rod.

17 Claims, 3 Drawing Sheets

(58) Field of Classification Search
USPC ..... 218/79, 80, 12, 55, 67, 68, 92, 100, 107
See application file for complete search history.

(56) References Cited

U.S. PATENT DOCUMENTS

| | | | | |
|---|---|---|---|---|
| 6,946,613 | B2 * | 9/2005 | Otsuka | H01H 31/32 218/78 |
| 8,487,203 | B2 * | 7/2013 | Shin | H01H 3/46 218/43 |
| 8,890,009 | B2 * | 11/2014 | Nitert | H01H 3/38 200/48 R |
| 9,343,881 | B2 * | 5/2016 | Hyrenbach | H02B 13/045 |
| 2005/0189326 | A1 | 9/2005 | Moser et al. | |
| 2006/0283842 | A1 | 12/2006 | Pavlovic et al. | |
| 2012/0312668 | A1 | 12/2012 | Lüthy et al. | |

FOREIGN PATENT DOCUMENTS

| | | | |
|---|---|---|---|
| EP | 3671986 | A1 | 6/2020 |
| EP | 3671989 | A1 | 6/2020 |
| WO | WO 2016/127156 | A1 | 8/2016 |

OTHER PUBLICATIONS

European Patent Office, International Search Report in International Patent Application No. PCT/EP2020/066077, 4 pp. (dated Sep. 1, 2020).
European Patent Office, Written Opinion in International Patent Application No. PCT/EP2020/066077, 8 pp. (dated Sep. 1, 2020).
European Patent Office, Office Action in European Patent Application No. 19181787.3, 10 pp. (dated Aug. 3, 2022).

* cited by examiner

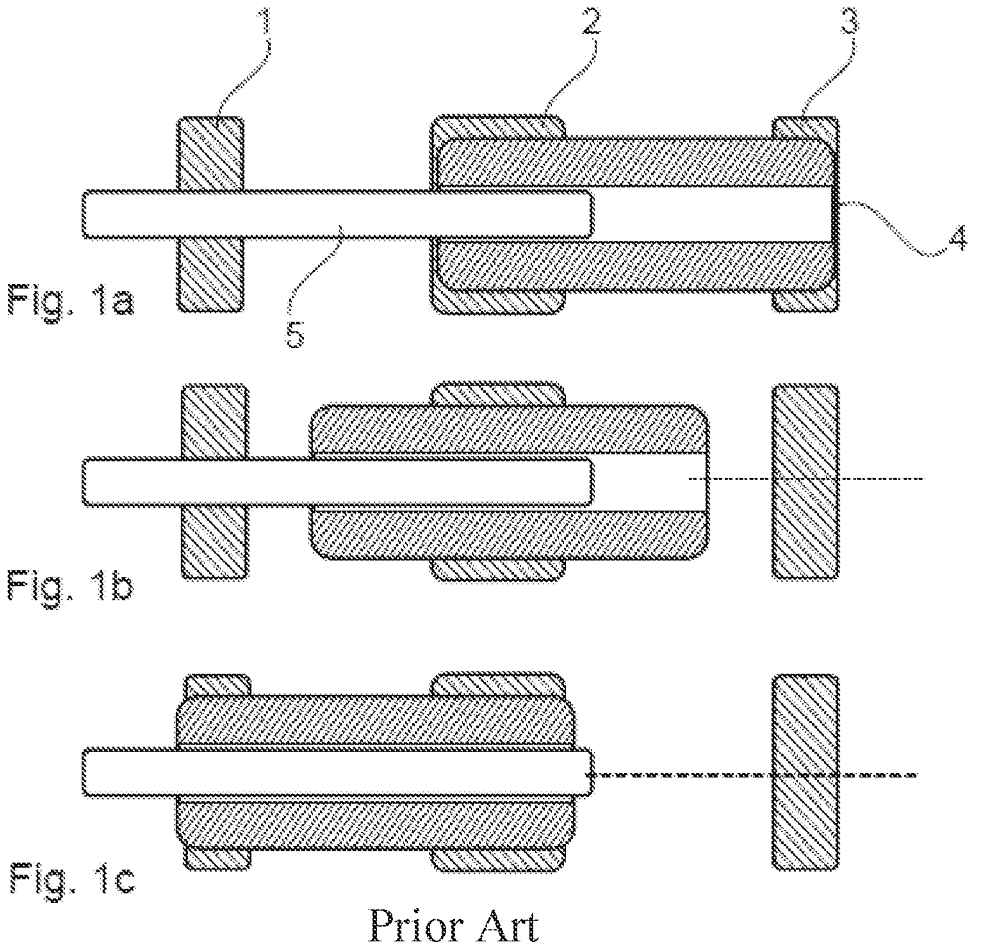
Prior Art
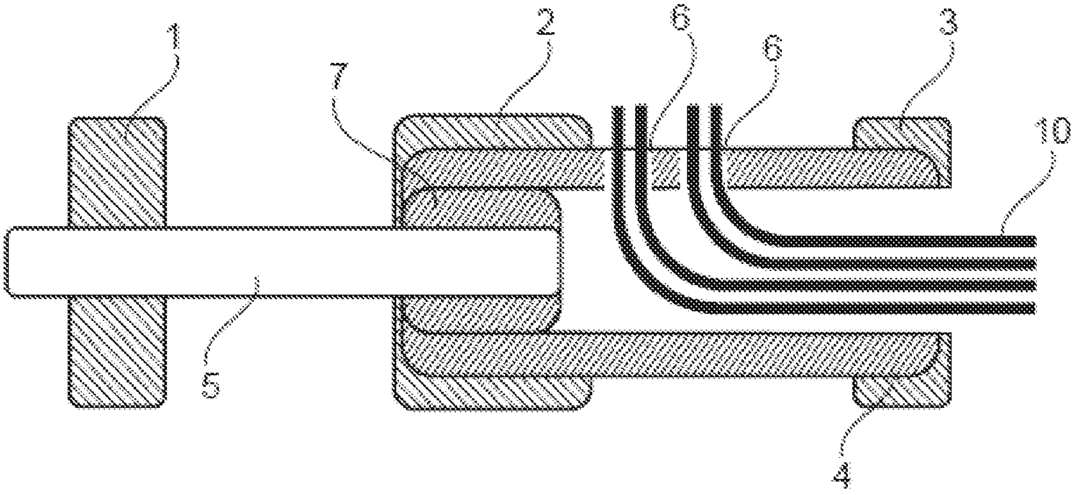
Fig. 2

THREE-POSITION DISCONNECTOR SWITCH

CROSS-REFERENCE TO PRIOR APPLICATIONS

This application is a continuation of International Patent Application No. PCT/EP2020/066077, filed on Jun. 10, 2020, which claims priority to European Patent Application No. EP 19181787.3, filed on Jun. 21, 2019. The entire disclosure of both applications is hereby incorporated by reference herein.

FIELD

One or more embodiments of the present invention may relate to three-position disconnector switch and a switchgear or control gear for low voltage, medium voltage, or high voltage use with a substation.

BACKGROUND

In state-of-art switchgear and control gear (also called control gear) designs linear three-position disconnector switches are utilized, but they can suffer from too great a temperature rise.

There is a need to address this issue.

SUMMARY

One or more embodiments of the present invention may provide a three-position disconnector switch that includes an earthing contact, a power out contact, a power in contact, a piston, and a threaded rod. A length of the piston is such that in a first switch position an outer surface of a wall of the piston makes electrical contact between the power out contact and the power in contact. The length of the piston is such that in a second switch position the outer surface of the wall of the piston does not make electrical contact with either the earthing contact or the power in contact. The length of the piston is such that in a third switch position the outer surface of the wall of the piston makes electrical contact between the earthing contact and the power out contact. The piston includes an inner threaded section configured to engage with the threaded rod. A length of the inner threaded section is less than the length of the piston. Rotation of the threaded rod is configured to engage with the inner threaded section to move the switch between the different switch positions.

Therefore, it may be advantageous to have means to reduce overheating of a three-position switch for a switchgear or control gear.

An object of one or more embodiments of the present invention may be solved with the subject matter of the independent claims, wherein further embodiments are incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1*a*, 1*b*, and 1*c* show schematic representations of cross-sections through a conventional design of linear three-position disconnector switch;

FIG. 2 shows a schematic representation of a cross-section through an example of the new design of linear three-position disconnector switch;

DETAILED DESCRIPTION

Figure 3A:
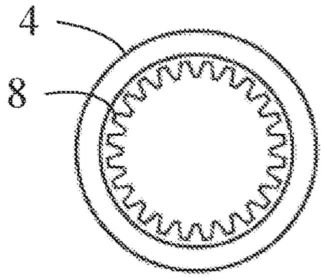
FIGS. 3*a*, 3*b*, and 3*c* show a schematic representations of examples of the piston with increased surface area of the new design of linear three-position disconnector switch.

In a first aspect, there is provided a three-position disconnector switch, comprising:

an earthing contact;

a power out contact;

a power in contact;

a piston; and a threaded rod.

A length of the piston is such that in a first switch position an outer surface of a wall of the piston makes an electrical contact between the power out contact and the power in contact. The length of the piston is such that in a second switch position the outer surface of the wall of the piston does not make an electrical contact with either the earthing contact or the power in contact. The length of the piston is such that in a third switch position the outer surface of wall of the piston makes an electrical contact between the earthing contact and the power out contact. The piston comprises an inner threaded section configured to engage with the threaded rod. A length of the inner threaded section is less than the length of the piston. Rotation of the threaded rod is configured to engage with the inner threaded section to move the switch between the different switch positions.

In an example, the inner threaded section is configured not to rotate with respect to the threaded rod as the threaded rod rotates.

In an example, the piston comprises a second inner section adjacent to the inner threaded section. The second inner section is configured not to engage with the threaded rod.

In an example, the length of the piston comprises a length of the second inner section added to the length of the inner threaded section.

In an example, a diameter of an inner cross section of the second inner section is substantially larger than a diameter of a cross section of the threaded rod.

In an example, an internal surface of the second inner section has a surface area greater than that of a smooth cylinder of the same length and internal diameter.

In an example, the internal surface of the second inner section is one of: threaded or has ridges extending in an axial direction.

In an example, a material is added to the inside of the second inner section to provide a surface area greater than that of a smooth cylinder of the same length and internal diameter.

In an example, the added material is one of: a tube, a sheet, and expanded metal or mesh, a corrugated sheet, an insulation material with high heat emissivity; a thermally conductive material.

In an example, an outer surface of the piston has a surface area greater than that of a smooth cylinder of the same length and external diameter.

In an example, the outer surface of the piston one of: threaded or has ridges extending in an axial direction.

In an example, the wall of the piston comprises one or more holes extending in a substantially radial direction. The piston is configured such that air can flow into the piston in an axial direction and flow out of the one or more holes, or configured such that air can flow into the piston through the one or more holes and out in an axial direction.

In an example, the earthing contact comprises one or more holes extending through an outer wall of the earthing contact in a substantially radial direction.

In an example, the power out contact comprises one or more holes extending through an outer wall of the power out contact in a substantially radial direction.

In an example, the power out and/or power in contact comprises one or more holes extending through an outer wall of the power in contact a substantially radial direction.

In a second aspect, there is provided a low voltage, medium voltage, or high voltage switchgear or control gear comprising one or more three-position disconnector switches according to the first aspect.

FIGS. 1*a*-1*c* shows an example of a conventional design of three-position disconnector switch Used in medium voltage applications, that has linear movement of components.

In FIG. 1*a* the following components are shown:

1: earthing contact housing,

2: power outgoing contact housing,

3: power incoming contact housing,

4: tube/piston housing arranged for conductive connection of required contacts, and

5: motor operated threaded rod which is used to move and hold the piston in a desired position.

However, the design is relatively large size and there is an inability easily to dissipate the heat during operation and the temperature rise testing, with heat transfer primarily occurring by radiation to the surrounding environment.

The new design of three-position disconnector switch addresses these problems. It is smaller, and air flow inside of the parts carrying high current is enabled to provide cooling.

FIGS. 2-5 relate to the new design of three-position disconnector switch. In an example, the three-position disconnector switch comprises an earthing contact 1, a power out contact 2, a power in contact 3, a piston 4, and a threaded rod 5. A length of the piston is such that in a first switch position an outer surface of a wall of the piston makes an electrical contact between the power out contact and the power in contact. The length of the piston is such that in a second switch position the outer surface of the wall of the piston does not make an electrical contact with either the earthing contact or the power in contact. The length of the piston is such that in a third switch position the outer surface of wall of the piston makes an electrical contact between the earthing contact and the power out contact. The piston comprises an inner threaded section 7 configured to engage with the threaded rod. A length of the inner threaded section is less than the length of the piston. Rotation of the threaded rod is configured to engage with the inner threaded section to move the switch between the different switch positions. This rotation can be provided by an appropriate motor.

In an example, the inner threaded section 7 is configured not to rotate with respect to the threaded rod as the threaded rod rotates.

In this way, as the threaded rod rotates, the inner threaded section 7 of the piston, which is connected to the main body of the piston, is moved up and down the threaded rod and moves the piston to its different switch positions depending on the direction of rotation of the threaded rod.

In an example, the inner threaded section 7 of the piston is fixedly connected to the main body of the piston.

In an example, the inner threaded section 7 is a nut fixed within a main body of the piston.

In an example, in the second position the outer surface of the wall of the piston makes an electrical contact with the power out contact.

According to an example, the piston comprises a second inner section adjacent to the inner threaded section. The second inner section is configured not to engage with the threaded rod.

According to an example, the length of the piston comprises a length of the second inner section added to the length of the inner threaded section.

According to an example, a diameter of an inner cross section of the second inner section is substantially larger than a diameter of a cross section of the threaded rod.

According to an example, an internal surface of the second inner section has a surface area greater than that of a smooth cylinder of the same length and internal diameter.

According to an example, the internal surface of the second inner section is one of: threaded or has ridges extending in an axial direction.

According to an example, a material is added to the inside of the second inner section to provide a surface area greater than that of a smooth cylinder of the same length and internal diameter.

According to an example, the added material is one of: a tube, a sheet, and expanded metal or mesh, a corrugated sheet, an insulation material with high heat emissivity; a thermally conductive material.

According to an example, an outer surface of the piston has a surface area greater than that of a smooth cylinder of the same length and external diameter.

According to an example, the outer surface of the piston one of: threaded or has ridges extending in an axial direction.

According to an example, the wall of the piston comprises one or more holes extending in a substantially radial direction, and wherein the piston is configured such that air can flow into the piston in an axial direction and flow out of the one or more holes, or such that air can flow into the piston through the one or more holes and out in an axial direction.

According to an example, the earthing contact comprises one or more holes extending through an outer wall of the earthing contact in a substantially radial direction.

According to an example, the power out contact comprises one or more holes extending through an outer wall of the power out contact in a substantially radial direction.

According to an example, the power out and/or power in contact comprises one or more holes extending through an outer wall of the power contact in a substantially radial direction.

One or more three-position disconnector switches as described above can be used in A low voltage, medium voltage, or high voltage switchgear or control gear.

In this way, improvement of the temperature distribution in a three-position disconnector switch is provided. Improved cooling is achieved by a hollow design of piston, with additional holes and increased inner/outer surface area of the piston. Further enhancements of the cooling effect is possible by allowing air flow in the power contact areas.

Continuing with FIGS. 2-5, as shown in FIG. 2 a smaller design of three-position disconnector switch is provided with an improvement of its temperature distribution. Improved cooling is achieved by a hollow design of piston together with hollow power contacts.

Referring to FIG. 2, this shows a hollow design with a power incoming contact 3, an opening in the front of the piston 4 and where there are additional holes 6 in the piston 4. A threaded rod is configured to moving through rotation within the nut 7, that is connected to the piston 4 in a way that the piston is moved back and forth without its own rotation. Thus, the nut 7 is pulled up and down the threaded rod as it rotates and in doing so moves the piston to different switching positions of the three-position disconnector switch. This design leads to an air 10 flowing through the piston 4 and thus significantly providing for an improved cooling effect. Such cooling can improve cooling of all parts which are in contact or in the vicinity of the piston. This cooling effect can be further improved by enlarging the inner surface area of the piston, or also the enlarging its outer surface area. Examples of the inner surface side cross-section are shown in FIGS. 3*a-c*.

Figure 3B:
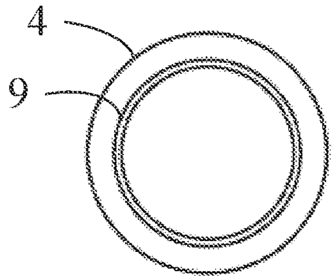
Figure 3C:
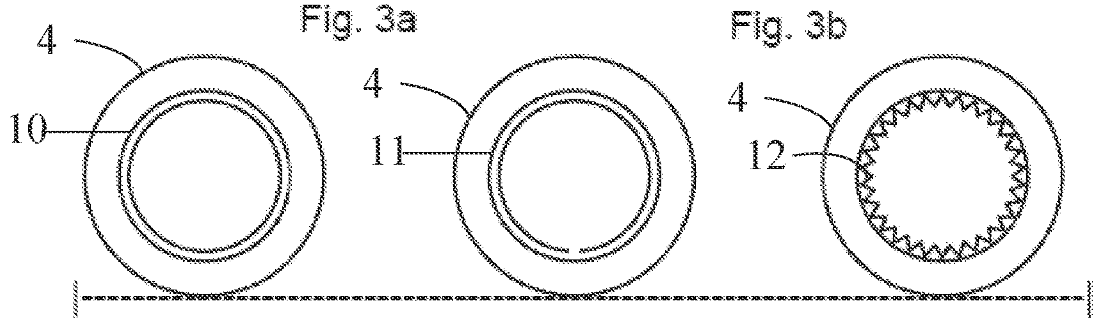

FIG. 3*a* there is shown an enlarged piston surface area of piston 4, for example by forming, at FIG. 3*b* there is shown an enlarged piston surface area achieved through a thread 9 being machined inside the piston, where this thread is different to the thread that the threaded rod engages and this part of the piston has a wider internal cross-section than that of the nut. FIG. 3*c* shows examples of additional material inserted within the piston interior. All of the examples of FIG. 3*a-c* provide for an increased surface area that leads to an improved cooling effect.

The Inner surface area 8 shown at FIG. 3*a* could be done for example by cold forming. Machining can be employed to provide the thread 9 (FIG. 3*b*) inside the piston. Additional materials 10, 11, or 12 can be inserted inside the piston area (FIG. 3*c*), where such material can be for example a tube, a sheet or expanded metal or mesh, or even the corrugated sheet or insulation material with high heat emissivity. Material of this additional part can be any kind of thermally conductive material.

Figure 4A:
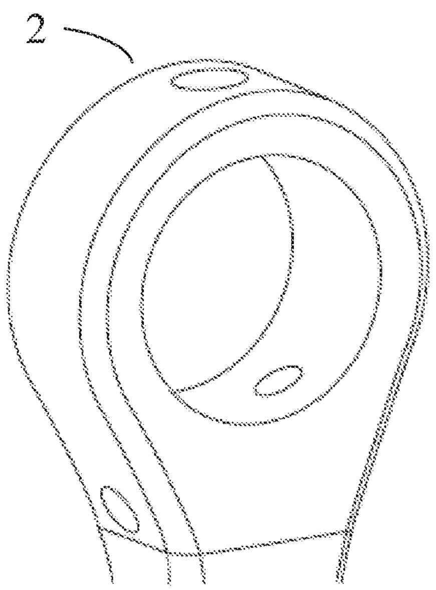
FIGS. 4*a* and 4*b* show schematic representations of examples of the power out contact of the new design of linear three-position disconnector switch.
Figure 4B:
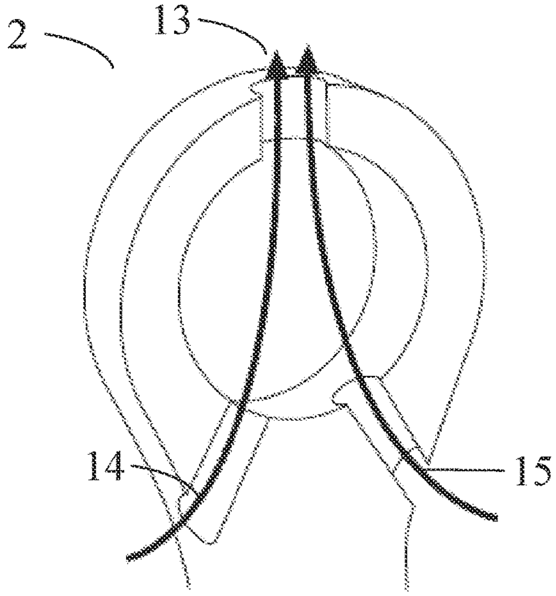
Figure 5:
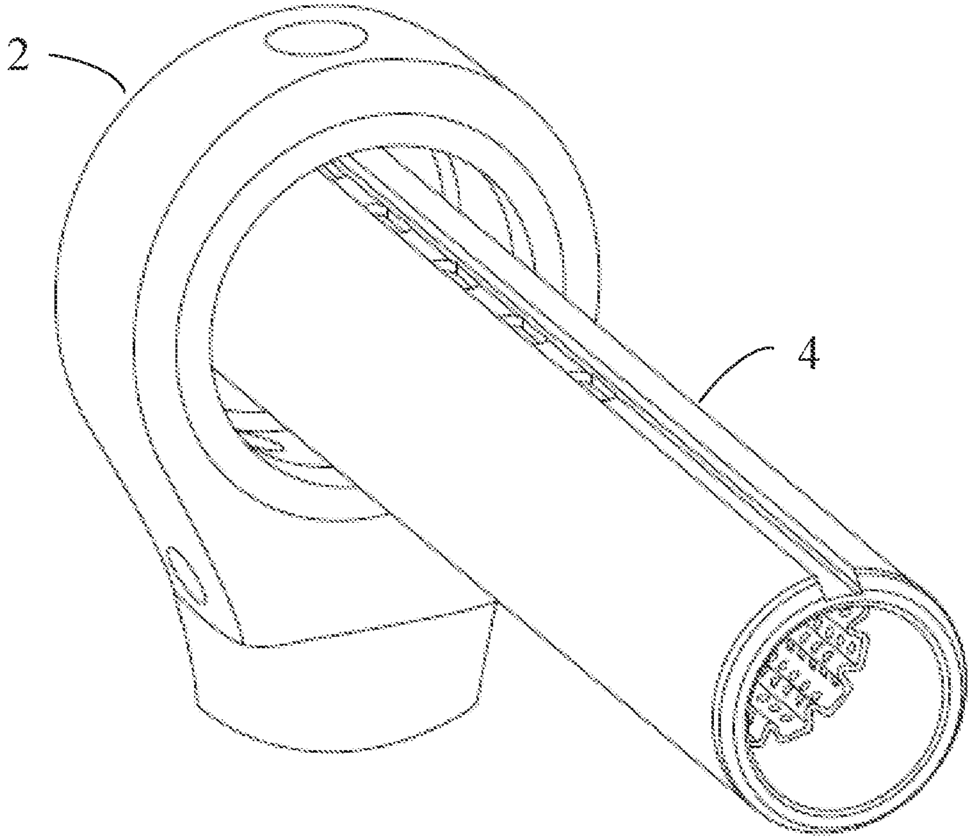
FIG. 5 shows a schematic example of the power out contact and the piston of the new design of linear three-position disconnector switch.

Further enhancement of the cooling effect in the power outgoing contact 2 or power incoming contact 3 can also be provided through the utilization of air flow. This is enabled by using a multilamella contact providing a circular hollow space in the contact area, and additional holes 13, 14, and 15 in the contact, which directs the air from the bottom to the top. This is shown in FIG. 4*a*, where a simplified 3D model of one of the contacts 2 is shown and a cross section view is also shown in FIG. 4*b*. This cooling embodiment involving additional holes 13, 14, and 15 in the contact 2 can be applied to all of the contact types. FIG. 5 then shows the piston 4 with one of the contacts 2, as discussed above.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A three-position disconnector switch, comprising:
- an earthing contact;
- a power out contact;
- a power in contact;
- a piston; and
- a threaded rod,
- wherein:
- a length of the piston is such that in a first switch position an outer surface of a wall of the piston makes an electrical contact between the power out contact and the power in contact,
- the length of the piston is such that in a second switch position the outer surface of the wall of the piston does not make an electrical contact with either the earthing contact or the power in contact,
- the length of the piston is such that in a third switch position the outer surface of the wall of the piston makes an electrical contact between the earthing contact and the power out contact,
- the piston comprises a first inner threaded section configured to engage with the threaded rod, wherein a length of the first inner threaded section is less than the length of the piston,
- rotation of the threaded rod is configured to engage with the first inner threaded section to move the switch between different switch positions, and
- the wall of the piston comprises one or more holes extending in a substantially radial direction, and wherein the piston is configured such that air can flow into the piston in an axial direction and flow out of the one or more holes, or such that air can flow into the piston through the one or more holes and out in an axial direction.

2. The three-position disconnector switch according to claim 1, wherein:
- the piston comprises a second inner section adjacent to the first inner threaded section, and
- the second inner section is configured not to engage with the threaded rod.

3. The three-position disconnector switch according to claim 2, wherein the length of the piston comprises a length of the second inner section added to the length of the first inner threaded section.

4. The three-position disconnector switch according to claim 2, wherein a diameter of a first inner cross section of the second inner section is substantially larger than a diameter of a cross section of the threaded rod.

5. The three-position disconnector switch according to claim 2, wherein an internal surface of the second inner section has a surface area greater than a surface area of a cylinder having a length and an internal diameter equal to that of a length and internal diameter of the second inner section without the internal surface.

6. The three-position disconnector switch according to claim 5, wherein the internal surface of the second inner section is: threaded or has ridges extending in an axial direction.

7. The three-position disconnector switch according to claim 2, wherein a material is added to the inside of the second inner section to provide a surface area greater than that of a surface area of a smooth cylinder having a length and internal diameter equal to that of a length and internal diameter of the second inner section without the internal surface.

8. The three-position disconnector switch according to claim 7, wherein the added material comprises at least one member of a group consisting of a tube, a sheet, an expanded metal or mesh, a corrugated sheet, an insulation material with high heat emissivity, and a thermally conductive material.

9. The three-position disconnector switch according to claim 1, wherein an outer surface of the piston has a surface area greater than that of a cylinder having a length and external diameter equal to that of a length and external diameter without the outer surface.

10. The three-position disconnector switch according to claim 9, wherein the outer surface of the piston either is threaded or has ridges extending in an axial direction.

11. The three-position switch according to claim 1, wherein the earthing contact comprises one or more holes extending through an outer wall of the earthing contact in a substantially radial direction.

12. The three-position switch according to claim 1, wherein the power out contact comprises one or more holes extending through an outer wall of the power out contact in a substantially radial direction.

13. The three-position switch according to claim 1, wherein the power out and/or the power in contact comprises one or more holes extending through an outer wall of the power contact in a substantially radial direction.

14. A low voltage, medium voltage, or high voltage switchgear or control gear comprising one or more three-position disconnector switches according to claim 1.

15. A three-position disconnector switch, comprising:
an earthing contact;
a power out contact;
a power in contact;
a piston; and
a threaded rod,
wherein:
a length of the piston is such that in a first switch position an outer surface of a wall of the piston makes an electrical contact between the power out contact and the power in contact,
the length of the piston is such that in a second switch position the outer surface of the wall of the piston does not make an electrical contact with either the earthing contact or the power in contact,
the length of the piston is such that in a third switch position the outer surface of the wall of the piston makes an electrical contact between the earthing contact and the power out contact,
the piston comprises an inner threaded section configured to engage with the threaded rod, wherein a length of the inner threaded section is less than the length of the piston, rotation of the threaded rod is configured to engage with the inner threaded section to move the switch between the different switch positions, and
the earthing contact comprises one or more holes extending through an outer wall of the earthing contact in a substantially radial direction.

16. A three-position disconnector switch, comprising:
an earthing contact;
a power out contact;
a power in contact;
a piston; and
a threaded rod,
wherein:
a length of the piston is such that in a first switch position an outer surface of a wall of the piston makes an electrical contact between the power out contact and the power in contact,
the length of the piston is such that in a second switch position the outer surface of the wall of the piston does not make an electrical contact with either the earthing contact or the power in contact,
the length of the piston is such that in a third switch position the outer surface of the wall of the piston makes an electrical contact between the earthing contact and the power out contact,
the piston comprises an inner threaded section configured to engage with the threaded rod, wherein a length of the inner threaded section is less than the length of the piston,
rotation of the threaded rod is configured to engage with the inner threaded section to move the switch between the different switch positions, and
the power out contact comprises one or more holes extending through an outer wall of the power out contact in a substantially radial direction.

17. A three-position disconnector switch, comprising:
an earthing contact;
a power out contact;
a power in contact;
a piston; and
a threaded rod,
wherein:
a length of the piston is such that in a first switch position an outer surface of a wall of the piston makes an electrical contact between the power out contact and the power in contact,
the length of the piston is such that in a second switch position the outer surface of the wall of the piston does not make an electrical contact with either the earthing contact or the power in contact,
the length of the piston is such that in a third switch position the outer surface of the wall of the piston makes an electrical contact between the earthing contact and the power out contact,
the piston comprises an inner threaded section configured to engage with the threaded rod, wherein a length of the inner threaded section is less than the length of the piston,
rotation of the threaded rod is configured to engage with the inner threaded section to move the switch between the different switch positions, and
the power out and/or the power in contact comprises one or more holes extending through an outer wall of the power contact in a substantially radial direction.

* * * * *